United States Patent
Bradley et al.

(10) Patent No.: US 10,172,005 B2
(45) Date of Patent: Jan. 1, 2019

(54) RESONANCE FREQUENCY DEVICE LOCKING

(71) Applicant: INTERNATIONAL BUSINESS MACHINES CORPORATION, Armonk, NY (US)

(72) Inventors: Lisa M. W. Bradley, Cary, NC (US); Jonathan Dunne, Dungarvan (IE); Liam Harpur, Skerries (IE); Asima Silva, Holden, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/494,933

(22) Filed: Apr. 24, 2017

(65) Prior Publication Data
US 2018/0310177 A1    Oct. 25, 2018

(51) Int. Cl.
*H04W 12/08* (2009.01)
(52) U.S. Cl.
CPC .................... *H04W 12/08* (2013.01)
(58) Field of Classification Search
None
See application file for complete search history.

(56) References Cited

U.S. PATENT DOCUMENTS

| | | |
|---|---|---|
| 2011/0314530 A1* | 12/2011 | Donaldson ............ G06F 21/83 726/7 |
| 2012/0244836 A1 | 9/2012 | Colbert |
| 2012/0309354 A1 | 12/2012 | Du |
| 2014/0168170 A1* | 6/2014 | Lazarescu ............ G06F 3/043 345/177 |
| 2015/0172927 A1 | 6/2015 | Miller |
| 2015/0365825 A1 | 12/2015 | De Léon et al. |
| 2016/0008182 A1* | 1/2016 | Prokopuk ............ A61F 13/42 604/361 |
| 2016/0027293 A1* | 1/2016 | Esteller ............ A61B 5/686 340/517 |
| 2016/0142816 A1 | 5/2016 | Weast et al. |
| 2017/0365903 A1* | 12/2017 | Zhang ............ H01P 1/203 |
| 2018/0011557 A1* | 1/2018 | Katsurahira ............ G06F 3/03 |

OTHER PUBLICATIONS

List of IBM Patents or Patent Applications Treated as Related 1 page.
Specification "Mobile Device Locking" and Drawings in U.S. Appl. No. 15/494,982, filed Apr. 24, 2017, 39 pages.
(Continued)

*Primary Examiner* — German Viana Di Prisco
(74) *Attorney, Agent, or Firm* — Michael P. O'Keefe; Andrew D. Wright; Roberts Mlotkowski Safran Cole & Calderon, P.C.

(57) ABSTRACT

Systems and methods for securing access to a mobile device are disclosed. A method includes: transmitting, by a computer device, a tone to a surface of an object; detecting, by the computer device, a frequency response from the object based on the transmitted tone; determining, by the computer device, that the detected frequency response from the surface of the object conforms to a stored frequency response; and unlocking, by the computer device, the computer device based on the determining.

15 Claims, 11 Drawing Sheets

(56) References Cited

OTHER PUBLICATIONS

Resonance Wikipedia page, https://en.wikipedia.org/wiki/Resonance, Wikipedia, Accessed Apr. 24, 2017, 8 pages.
Office Action from U.S. Appl. No. 15/494,982 dated Feb. 8, 2018, 13 pages.
Office Action from U.S. Appl. No. 15/844,954 dated Feb. 26, 2018, 14 pages.
Godshall, "Frequency Response, Damping, and Transmissibility Characteristics of Top-Loaded Corrugated Containers", Forest Products Laboratory, Forest Service, U.S. Department of Agriculture, Madison, Wisconsin, 1971, 14 pages.
Notice of Allowance from U.S. Appl. No. 15/844,954 dated Jul. 17, 2018; 8 pages.
Notice of Allowance from U.S. Appl. No. 15/494,982 dated Jul. 20, 2018; 8 pages.

* cited by examiner

RESONANCE FREQUENCY DEVICE LOCKING

BACKGROUND

The present invention relates generally to mobile device security and, more particularly, to a system and method for securing access to a mobile device according to a resonance frequency received by the mobile device.

Currently, individuals access digital information in ever increasing quantities and across a disparate set of devices. As access to information technology improves, security attacks on the devices used by the individuals continue to spread. Almost every week, news reports of high level security breaches of consumer data with the latest security protections being circumvented. Presently, security measures implemented on mobile devices include password protection and other methods of direct user authentication.

SUMMARY

In an aspect of the invention, a computer implemented method includes: transmitting, by a computer device, a tone to a surface of an object; detecting, by the computer device, a frequency response from the object based on the transmitted tone; determining, by the computer device, that the detected frequency response from the surface of the object conforms to a stored frequency response; and unlocking, by the computer device, the computer device based on the determining.

In another aspect of the invention, a computer program product comprises a computer readable storage medium having program instructions embodied therewith. The program instructions are executable by a computer device to cause the computer device to: calibrate the computer device to an object; transmit a tone to a surface of the object; detect a frequency response from the object based on the transmitted tone; determine that the detected frequency response from the surface of the object conforms to a stored frequency response; and unlock the computer device based on the determining.

In another aspect of the invention, there is a system for securing access to a mobile device. The system includes: a CPU, a computer readable memory and a computer readable storage medium associated with a computer device; program instructions to calibrate the computer device to an object; program instructions to transmit a tone to a surface of the object; program instructions to detect a frequency response from the object based on the transmitted tone; program instructions to determine that the detected frequency response from the surface of the object conforms to a stored frequency response; and program instructions to unlock the computer device based on the determining. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
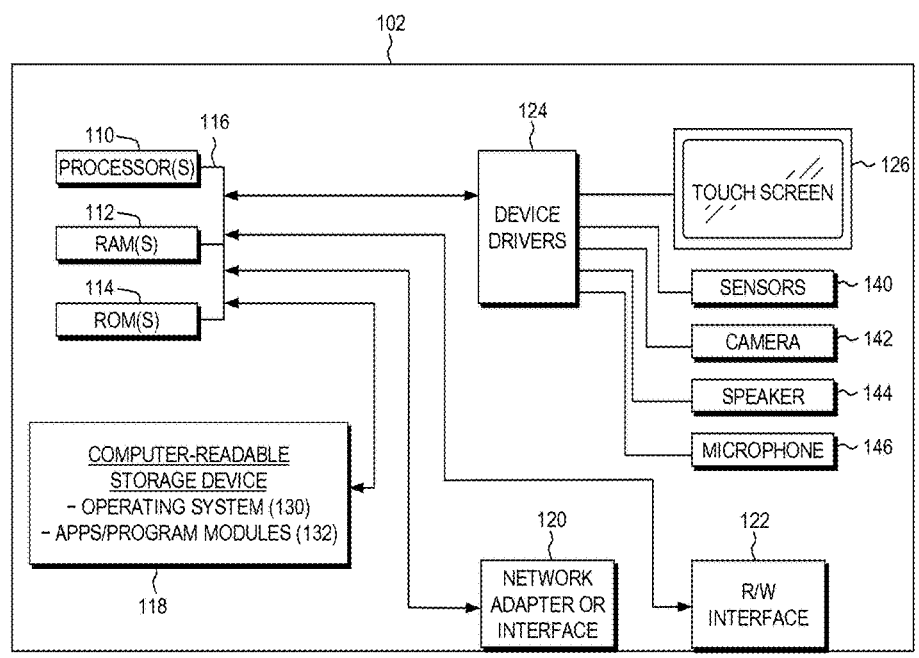
FIG. 1 depicts a block diagram of components of a computing device according to an embodiment of the present invention.

The present invention relates generally to mobile device security and, more particularly, to a system and method for securing access to the mobile device according to a resonance signature received by the mobile device. Traditionally, individuals accessed data only on desktop systems; however, with advances in computing technology, individuals now access data on an ever increasing number of mobile and smart systems. Security measures, such as fingerprint recognition, voice recognition, and numerical pass codes that have proved successful in the past are now being circumvented on mobile devices. As individuals consume more data than before from electronic storage systems, more unauthorized attempts to obtain valuable data from these system devices will occur. As these electronic storage systems are gateways to cloud based applications services and infrastructure, there exists the possibility that an attacker (who is able to circumvent the device security) may cause damage to server side infrastructure since the attacker has access to a trusted device. Aspects of the invention recognize that, with the number of mobile devices with poor security protection, it is advantageous to protect data on mobile devices from unwarranted intrusion. Aspects of the invention are also directed to securing data on a mobile device through non-traditional security procedures.

In aspects, a device is calibrated to unlock only when a specific frequency is emitted when the device is placed on a specific surface. Since the device is aware of resting on a particular surface, the device emits a frequency (i.e., an acoustic wave), which is complementary to the surface. If the acoustic frequency wave (e.g., resonance frequency) emitted from the particular surface conforms to (e.g., matches) stored acoustic frequency wave (e.g., stored resonance frequency), the device unlocks.

In aspects, a mobile device is configured to emit a tone in the direction of a surface of an object in response to the mobile device contacting the object. In aspects, the mobile device receives a resonance frequency from the object based on the tone transmitted to the object. In other aspects, the mobile device compares the received resonance frequency to a stored resonance frequency of the object. Based on the comparing, the mobile device is configured to one of: grant access (i.e., unlock the mobile device) when the received resonance frequency conforms to the stored resonance frequency of the object; and deny access (i.e., lock the mobile device) when the received resonance frequency does not conform to the stored resonance frequency of the object.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a block diagram of components of a computing device 102, in accordance with an embodiment of the present invention is shown. In an exemplary embodiment, computing device 102 includes one or more processors 110, one or more computer-readable RAMs 112, one or more computer-readable ROMs 114, and one or more computer-readable storage devices 118 on one or more buses 116. One or more operating systems 130, and one or more apps or program modules 132 are stored on the one or more computer-readable tangible storage devices 118 for execution by one or more of the processors 110 via one or more of the RAMs 112 (which typically include cache memory). In the illustrated embodiment, each of the computer-readable tangible storage devices 118 is a semiconductor storage device such as ROM 114, EPROM, flash memory or any other computer-readable tangible storage device that can store a computer program and digital information. Alternatively, each of the computer-readable tangible storage devices 118 is a magnetic disk storage device of an internal hard drive.

Computing device 102 also includes a read/write (R/W) interface 122, for example, a USB port, to read from and write to external computing devices or one or more portable computer-readable storage devices such as a CD-ROM, DVD, memory stick, magnetic disk, optical disk or semiconductor storage device. The apps and program modules 132 can be stored on the external computing devices or one or more of the portable computer-readable tangible storage devices, read via the R/W interface 122 and loaded onto the computer-readable tangible storage device 118.

Computing device 102 also includes a network adapter or interface 120, such as a TCP/IP adapter card or wireless communication adapter (such as a 4G wireless communication adapter using OFDMA technology). The apps and programs modules 132 can be downloaded to computing device 102 from an external computer or external storage device via a network (for example, the Internet, a local area network, a wide area network, or a wireless network) and network adapter or interface 120. From the network adapter or interface 120, apps and program modules 132 are loaded into computer-readable tangible storage device 118. The network may comprise copper wires, optical fibers, wireless transmission, routers, firewalls, switches, gateway computers and/or edge servers.

Computing device 102 also includes a touch screen 126, sensors 140, for example, touch screen sensors and magnetically sensitive circuits, and device drivers 124 to interface to touch screen 126 for imaging, to sensors 140 for pressure sensing of alphanumeric character entry and user selections and for detecting magnetic flux and polarity. Computing device 102 also includes a camera 142, a speaker 144, and a microphone 146. The device drivers 124, R/W interface 122 and network adapter or interface 120 comprise hardware and software (stored in computer-readable tangible storage device 118 and/or ROM 114).

It should be appreciated that FIG. 1 provides only an illustration of one implementation and does not imply any limitations with regard to the environments in which different embodiments may be implemented. Many modifications to the depicted environment may be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method and program product have been disclosed for selecting a user environment based on a device cover. However, numerous modifications and substitutions can be made without deviating from the scope of the present invention. Therefore, the present invention has been disclosed by way of example and not limitation.

Figure 2:
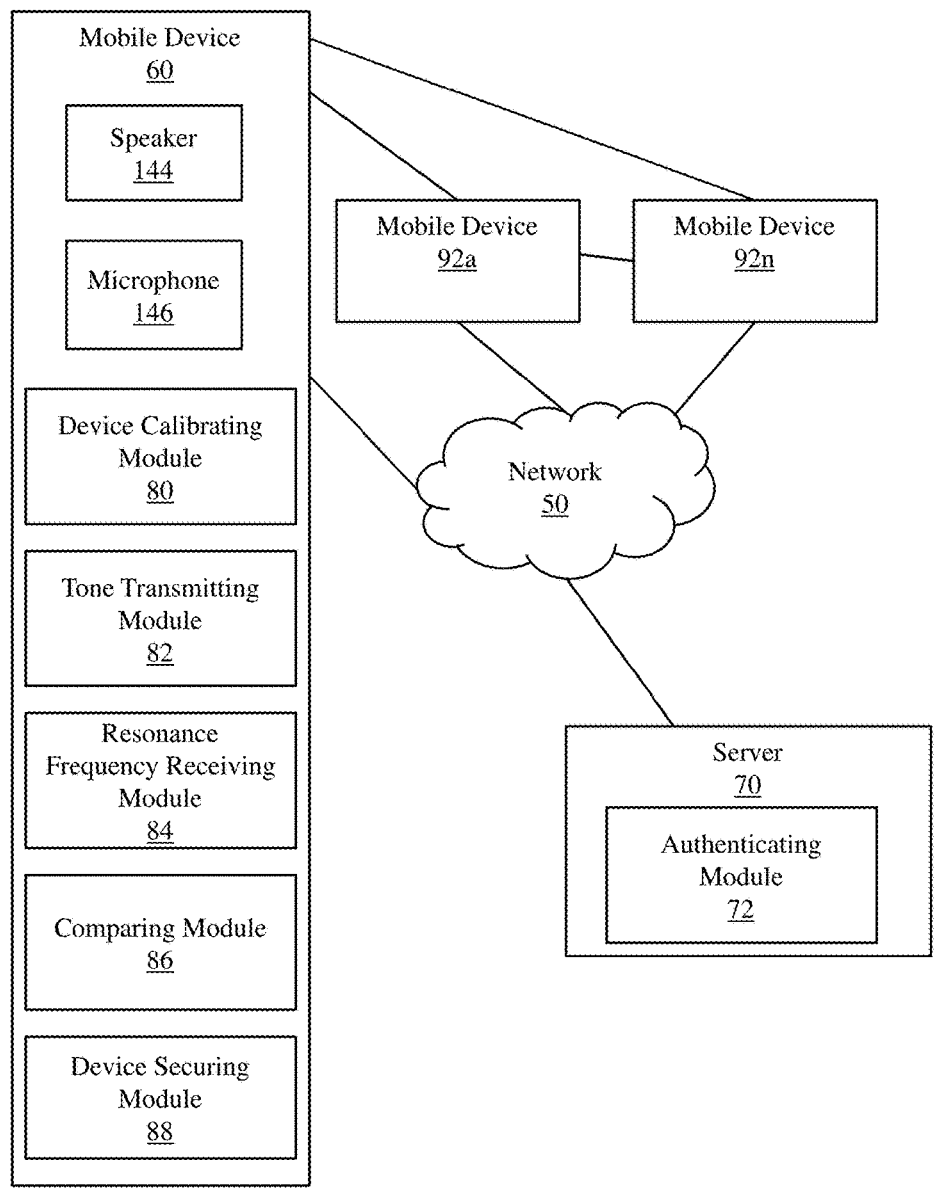
FIG. 2 shows an exemplary environment in accordance with aspects of the invention.

FIG. 2 shows an exemplary environment in accordance with aspects of the invention. The environment includes a mobile device 60 which may comprise a computing device 102 of FIG. 1, and may be connected to a network 50 (e.g., via the network adapter 120 of FIG. 1). The network 50 may be any suitable communication network or combination of networks, such as a local area network (LAN), a general wide area network (WAN), a public network (e.g., the Internet), a 3G network, a Long-Term Evolution (LTE) network, and/or a 5G network.

Referring to FIG. 2, the mobile device 60 may be a general purpose mobile computing device, such as laptop computer, tablet computer, smartphone, etc. In aspects, the mobile device 60 may comprise a plurality of modules configured to perform one or more functions described herein. In aspects, the mobile devices 60 may include one or more components of a computer system similar to the computing system 102 of FIG. 1, to store information in a memory (e.g., one or more of 112, 114 and 118 of FIG. 1). In aspects, the mobile device 60 may include additional or fewer modules than those shown in FIG. 2. In aspects, separate components may be integrated into a single computing component or module. Additionally, or alternatively, a single module may be implemented as multiple computing components or modules.

In aspects, the mobile device 60 includes a microphone (e.g., microphone 146 of FIG. 1), a speaker (e.g., speaker 144 of FIG. 1), a device calibrating module 80, a tone transmitting module 82, a resonance frequency receiving module 84, a comparing module 86, and a device securing module 88, which may each comprise one or program modules (e.g., program module 132 of FIG. 1) executed by the mobile device 60. In aspects, the device calibrating module 80 is configured to calibrate the mobile device 60 to detect a resonance frequency (i.e., frequency response) from a trusted object and store the resonance frequency of the trusted object in a memory. In aspects, the tone transmitting module 82 is configured to cause the mobile device 60 to transmit a tone to a surface of an object (e.g., a wood table). In aspects, the resonance frequency receiving module 84 is configured to receive a resonance frequency from an object based on a transmitted tone. In aspects, the comparing module 86 is configured to compare a received resonance frequency from an object with a stored resonance frequency of a trusted object. In aspects, the device securing module 88 is configured to lock/unlock the mobile device 60 based on the comparison of a received resonance frequency from an object with a stored resonance frequency of a trusted object.

Still referring to FIG. 2, the mobile device 60 may be configured for direct point-to-point communication (e.g., Bluetooth) with one or more mobile devices 92a-n and wireless communication (e.g., 3G, LTE) with one or more mobile devices 92a-n over the network 50. In aspects, the mobile devices 92a-n may each be a general purpose mobile computing device, such as laptop computer, tablet computer, smartphone, etc. In aspects, the mobile devices 92a-n may include one or more components of a computer system similar to the computing system 102 of FIG. 1, to store information in a memory (e.g., one or more of 112, 114 and 118 of FIG. 1). In aspects, the mobile devices 92a-n may include one or more of the modules of the mobile device 60. In aspects, the mobile devices 92a-n are represented as mobile device 92a to mobile device 92n, where n may be any appropriate number of separate mobile devices that perform wireless communication with the mobile device 60 over the network 50 and point to point communication with other mobile devices.

Referring to FIG. 2, the mobile device 60 and the mobile devices 92a-n may be configured for communication with a server 70 over the network 50. The server 70 may be a computer system similar to computing system 102 in FIG. 1. In aspects, the server 70 includes an authenticating module 72 configured to transmit authentication information to establish a group connection between the mobile device 60 and the mobile devices 92a-n.

In accordance with embodiments of the invention, the device calibrating module 80 calibrates the mobile device 60 to detect a resonance frequency of a trusted object. Each type of object, e.g., glass, oak wood, birch wood, emits a resonance frequency in response to a driving of the surface of the object with a signal from a vibrating system. At the resonance frequency, the driving of the surface of the object with small periodic driving forces produces large amplitude oscillations, due to the storage f vibrational energy in the object. In aspects, the surface of the object absorbs more energy from the driving signal as a frequency of the driving signal approaches the resonance frequency of the object. That is, as the signal from the vibrating system conforms to a resonance frequency of the object, the rate of transmissibility (e.g., the ratio of the output frequency over the input frequency or the amplitude of the oscillation) from the object increases. By way of example, at the resonance frequency, the amplitude of the oscillation emitted from the object increases as the surface of the object absorbs more energy from the driving signal.

In accordance with aspects of the invention, the device calibrating module 80 may calibrate the mobile device 60 to a trusted object by transmitting multiple signals from the mobile device 60 to the surface of the trusted object and receiving a resonance frequency from the trusted object. In aspects, the device calibrating module 80 stores the resonance frequency of the trusted object in a memory (e.g., one or more of 112, 114 and 118 of FIG. 1). In aspects, the device calibrating module 80 is configured to calibrate the mobile device 60 to multiple trusted objects and store the resonance frequency of each trusted object. For example, the device calibrating module 80 may calibrate the mobile device 60 to detect resonance frequency of a trusted birch wood table in a work environment of a user and store the resonance frequency of the trusted birch wood table.

Figure 4:
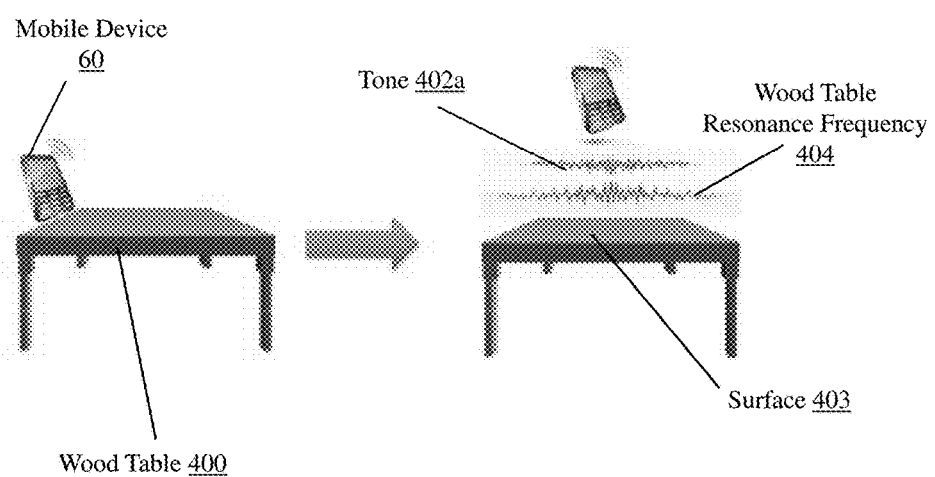
FIG. 4 shows an exemplary use in accordance with embodiments of the invention.

In accordance with aspects of the invention, the tone transmitting module 82 may transmit a tone 402a (e.g., as shown in FIG. 4) from the mobile device 60 to a surface of an object. In aspects, the tone 402a may include a sound pulse (e.g., a pulse of white noise, a pulse of a particular frequency, or other acoustic pulse) transmitted as an energy wave for a short time duration (e.g, one or two seconds) from the speaker 144 of the mobile device 60. For example, the tone transmitting module 82 may transmit a short pulse of a monotonic tone from the speaker 144 of the mobile device 60 to a surface of a birch wood table.

In accordance with aspects of the invention, based on the transmitting, the resonance frequency receiving module 84 may receive (e.g., at the microphone 146 on the mobile device 60) a resonance frequency from the object. In aspects, the resonance frequency receiving module 84 may receive multiple signals (e.g., resonance frequencies from multiple objects) received at the microphone 146 on the mobile device 60 and perform a Fast Fourier Transform to determine an amplitude per signal. In aspects, the resonance frequency receiving module 84 may include a filter array to filter the resonance frequencies from multiple objects such that only the resonance frequency from a particular object (e.g., the surface of the birch wood table) is processed by the comparing module 86.

In aspects, the received resonance frequency may include information relating to: a time period of the transmission of the tone to the reception of the resonance frequency (temporal period), a transmissibility of the surface of the object, and a damping coefficient (e.g., a dimensionless measure describing the coefficient of how oscillations in a system decay over time) of the surface of the object. In aspects, the resonance frequency receiving module 84 may determine the temporal period, the transmissibility, and the damping coefficient of the object based on receiving the resonance frequency of the object. For example, the resonance frequency receiving module 84 may receive, at the microphone 146 of the mobile device 60, a resonance frequency from the surface of the birch wood table based on the transmission of the short pulse of the monotonic tone from the speaker 144 of the mobile device 60 and determine the temporal period, the transmissibility, and the damping coefficient of the birch wood table.

In accordance with aspects of the invention, based on receiving the resonance frequency from the object, the comparing module 86 compares the received resonance frequency of the object to a stored resonance frequency of the trusted object. By way of example, each trusted object has a specific resonance frequency, temporal period, transmissibility, and damping coefficient which may be detected by the resonance frequency receiving module 84 on the mobile device 60. In aspects, based on receiving the resonance frequency from the object, the comparing module 86 compares the received resonance frequency from the object to determine the received resonance frequency conforms or does not conform to the stored resonance frequency of the trusted object.

In aspects, the comparing module 86 compares the temporal period, the transmissibility, and the damping coefficient of received from the object on the received resonance frequency with the temporal period, the transmissibility, and the damping coefficient of the trusted object. In aspects, each trusted object has a specific resonance frequency, temporal period, transmissibility, and damping coefficient which may be detected by the resonance frequency receiving module 84 and compared to the stored specific resonance frequency, temporal period, transmissibility, and damping coefficient of the trusted object which are stored as a table in memory (e.g., one or more of 112, 114 and 118 of FIG. 1), examples of which are illustrated in Table 1.

TABLE 1

Object Resonance Table

| Surface | Resonance Frequency | Temporal Period | Transmissibility/ Damping Coefficient |
|---|---|---|---|
| Birch Wood Table | 110 Hertz | 3 seconds | 2.5/0.2 |
| Oak Wood Table | 440 Hertz | 5 seconds | 4.8/0.1 |
| Glass Surface | 900 Hertz | 4 seconds | 3.45/0.25 |

For example, the comparing module 86 may compare the resonance frequency, temporal period, transmissibility, and damping coefficient of the received resonance frequency of the birch wood table to determine the received resonance frequency does or does not conform to the resonance frequency (110 Hz), temporal period (3 seconds), transmissibility/damping coefficient (2.5/0.2) of a trusted birch wood table stored in memory (e.g., one or more of 112, 114 and 118 of FIG. 1).

In accordance with aspects of the invention, based on the comparing, the device securing module 88 locks/unlocks the mobile device 60. In aspects, locking the mobile device includes securing the mobile device from unwarranted access to information on the mobile device 60. In aspects, unlocking the mobile device 60 includes granting access to information on the mobile device 60. In aspects, based on the received resonance frequency from the object conforming to the stored resonance frequency of the trusted object, the device securing module 88 unlocks the mobile device 60. In other aspects, based on the received resonance frequency from the surface of the object not conforming to the stored resonance frequency of the trusted object, the device securing module 88 locks the mobile device 60. For example, based on the received resonance frequency from the birch wood table conforming or not conforming to the resonance frequency of the trusted birch wood table, the device securing module 88 may unlock or lock the mobile device 60.

Figure 3:
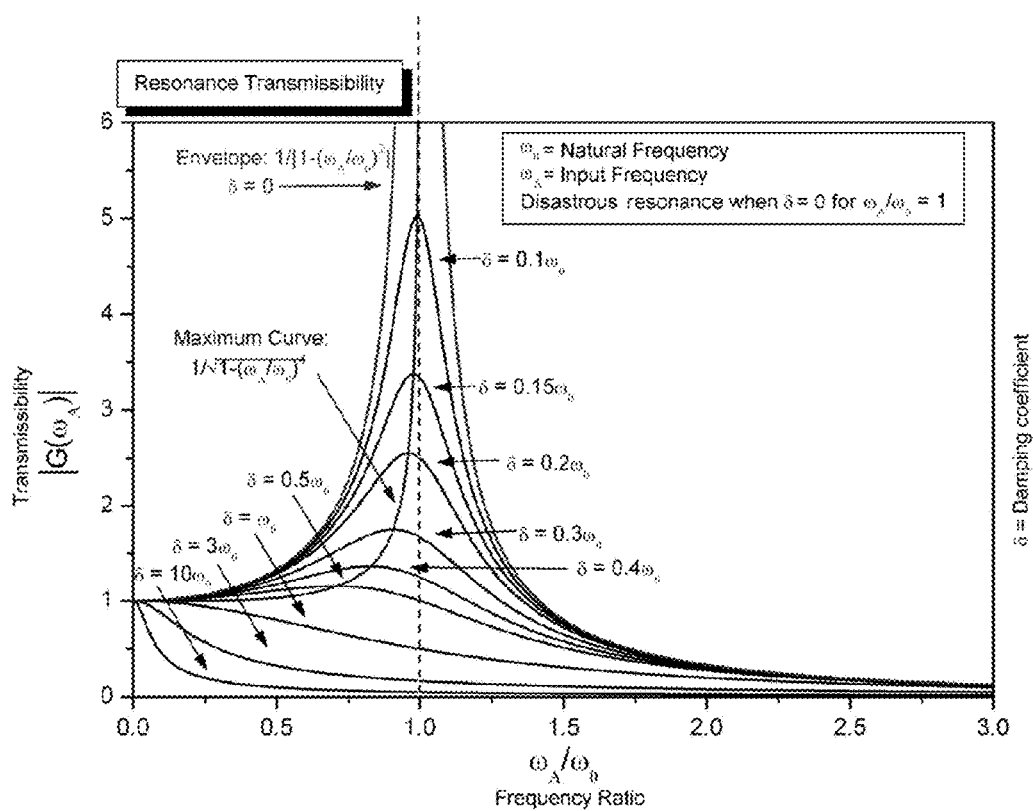
FIG. 3 illustrates an example graph of a resonance frequency in accordance with aspects of the invention.

FIG. 3 illustrates an example graph of a resonance frequency of an object. The example graph illustrates the frequency ratio in Megahertz (Mhz), the transmissibility over time, and the damping coefficient of the surface of an object. In aspects, as described with reference to FIG. 2, based on the tone transmitting module 82 transmitting a tone to a surface of an object, a received resonance frequency from the object may be illustrated as a graph similar to the graph of FIG. 3. In aspects, based on the received resonance frequency, the comparing module 86 compares the received resonance frequency of the object with a stored resonance frequency of a trusted object stored in the a memory (e.g., one or more of 112, 114 and 118 of FIG. 1). In aspects, based on the received resonance frequency of the object conforming to the stored resonance frequency of the trusted object, the device securing module 88 unlocks the mobile device 60.

FIG. 4 depicts an exemplary use scenario in accordance with embodiments of the invention wherein the mobile device 60 is placed on a single surface of an object (i.e., the wood table 400) to unlock the features of the mobile device 60. The scenario of FIG. 4 may be performed in the environment of FIG. 2. In aspects, based on placing the mobile device 60 on the wood table 400, the tone transmitting module 82 on the mobile device 60 transmits a tone 402 onto a surface 403 of a wood table 400. In aspects, based on transmitting the tone 402, the resonance frequency receiving module 84 on the mobile device 60 receives a wood table resonance frequency 404 from the wood table 400. In aspects, based on receiving the wood table resonance frequency 404, the comparing module 86 on the mobile device 60 compares the wood table resonance frequency 404 with a stored resonance frequency of a trusted wood table stored in memory (e.g., one or more of 112, 114 and 118 of FIG. 1). In aspects, based on the received wood table resonance frequency 404 of the wood table 400 conforming to the stored resonance frequency of the trusted wood table, the device securing module 88 unlocks the mobile device 60.

Figure 5:
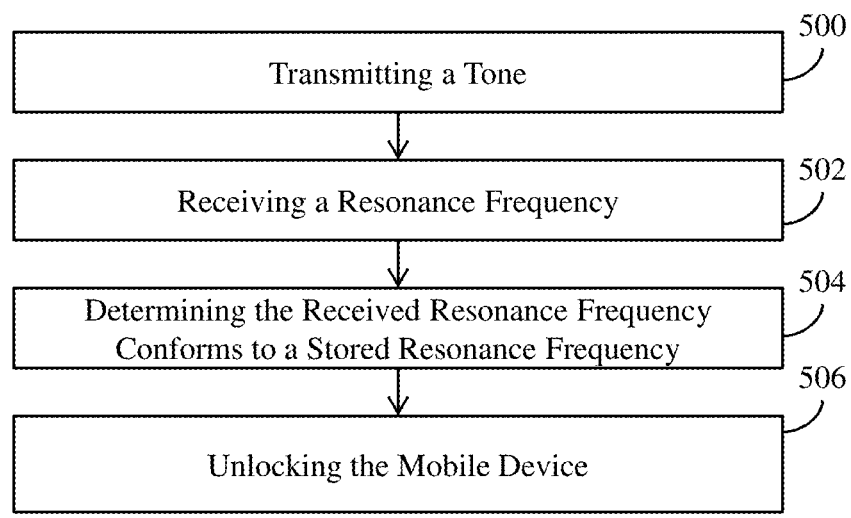
FIG. 5 illustrates a flowchart of steps of a method in accordance with aspects of the invention.

FIG. 5 shows a flowchart of steps of a method in accordance with aspects of the invention. The steps of the method may be performed in the system of FIG. 2 and are described with reference to the elements and functions described in FIGS. 2 and 4.

At step 500, the mobile device 60 transmits a tone 402a to a surface of an object. In aspects, the tone transmitting module 82 transmits the tone 402a from the mobile device 60 to the surface of the object. The tone 402a may be a pulse of white noise, a pulse of a particular frequency, or other acoustic pulse and may be transmitted from a speaker 144 of the mobile device 60.

At step 502, based on transmitting the tone 402a at step 500, the mobile device 60 receives a resonance frequency (i.e., frequency response) from the object. In aspects, based on transmitting the tone 402a at step 500, the resonance frequency receiving module 84 receives the resonance frequency from the object. In aspects, the resonance frequency includes information such as: the temporal period, the transmissibility, and the damping coefficient of the surface of the object.

At step 504, based on receiving the resonance frequency from the object at step 502, the mobile device 60 determines the received resonance frequency from the object to a stored resonance frequency of a trusted object. In aspects, based on receiving the resonance frequency from the object at step 502, the comparing module 86 determines whether the received resonance frequency conforms to the stored resonance frequency of the trusted object. In aspects, the comparing includes comparing the resonance frequency, temporal period, transmissibility, and damping coefficient of the object with the resonance frequency, temporal period, transmissibility, and damping coefficient of the trusted object stored in memory (e.g., one or more of 112, 114 and 118 of FIG. 1).

At step 506, based on determining that the received resonance frequency conforms to the stored resonance frequency of the trusted object at step 504, the mobile device 60 unlocks. In aspects, as described with respect to FIG. 2, based on determining that the received resonance frequency conforms to the stored resonance frequency of the trusted object at step 504, the device securing module 88 unlocks the mobile device 60. Unlocking may comprise, for example, changing the displayed output of the mobile device 60 from a lock screen (e.g., via which a user may not access applications or data stored on the mobile device 60) to a home screen (e.g., via which a user may access applications or data stored on the mobile device 60).

Figure 6:
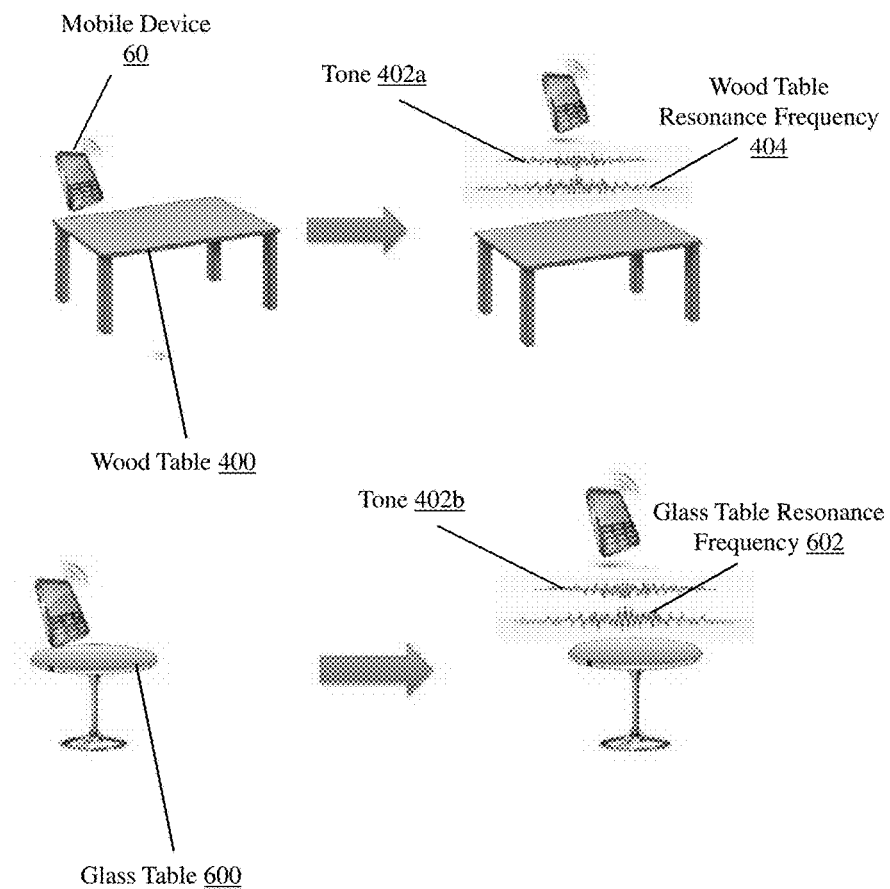
FIG. 6 shows an exemplary use in accordance with embodiments of the invention.

FIG. 6 depicts an exemplary use scenario in accordance with embodiments of the invention, wherein the mobile device 60 is placed on multiple surfaces to unlock the features of the mobile device 60. The scenario of FIG. 6 may be performed in the environment of FIG. 2. In aspects, the mobile device 60 undergoes a first sequence, which is similar to the sequence of FIG. 4, comprising: placing the mobile device 60 on a first object (i.e., a wood table 400), transmitting a tone 402a, receiving a wood table resonance frequency 404, and comparing the wood table resonance frequency 404 with a stored resonance frequency of a trusted wood table. In the example of FIG. 6, the mobile device 60 also undergoes a secondary sequence in order to unlock the mobile device 60. In aspects, based on the received wood table resonance frequency 404 of the wood table 400 conforming to the stored resonance frequency of the trusted wood table, the mobile device 60 may be placed on a second surface (i.e., a glass table 600). In aspects, based on the placing, the tone transmitting module 82 transmits a tone 402b onto the surface of the glass table 600. In aspects, based on transmitting the tone 402b to the surface of the glass table 600, the resonance frequency receiving module 84 receives a glass table resonance frequency 602. In aspects, based on transmitting the tone 402b, the comparing module 86 compares the glass table resonance frequency 602 with a stored resonance frequency of a trusted glass table. In aspects, based on the received wood table resonance frequency 404 of the wood table 400 conforming to the stored resonance frequency of the trusted wood table and based on the received glass table resonance frequency 602 conforming to the stored resonance frequency of the trusted glass table, the device securing module 88 unlocks the mobile device 60.

Figure 7:
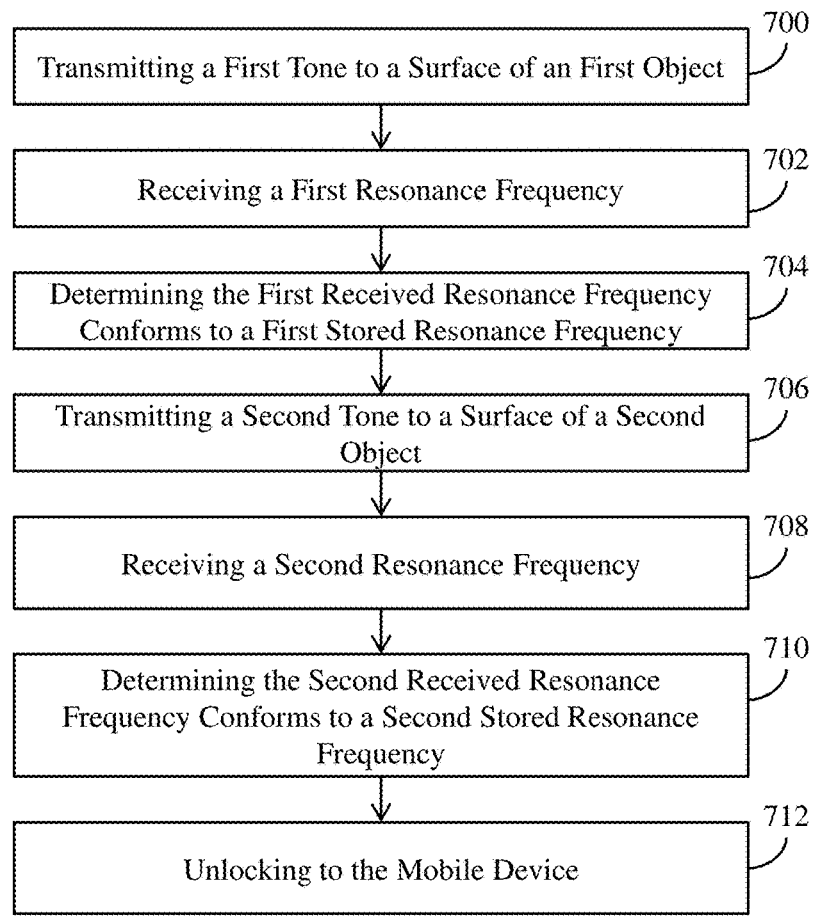
FIG. 7 illustrates a flowchart of steps of a method in accordance with aspects of the invention.

FIG. 7 shows a flowchart of steps of a method in accordance with aspects of the invention. The steps of the method may be performed in the system of FIG. 2 and are described with reference to the elements and functions described in FIGS. 2 and 6.

At steps 700, 702, and 704, the mobile device 60 transmits a first tone to a surface of a first object, receives a first resonance frequency from the first object, and compares the first received resonance frequency from the first object to determine the first received resonance frequency conforms to a first stored resonance frequency of a first trusted object. In aspects, the tone transmitting module 82 transmits the first tone from the mobile device 60 to the surface of the first object at step 700. At step 702, based on transmitting the first tone at step 700, the resonance frequency receiving module 84 may receive the first resonance frequency (i.e., frequency response) from the first object. At step 704, based on receiving the first resonance frequency at step 702, the comparing module 86 may compare the first received resonance frequency from the first object to determine the first received resonance frequency conforms to the first stored resonance frequency of the first trusted object.

At steps 706, 708, 710, and 712, based on determining the first received resonance frequency conforms to the first stored resonance frequency of the first trusted object at step 704, the mobile device 60 transmits a second tone to a surface of a second object, receives a second resonance frequency from the second object, and compares the second received resonance frequency from the second object to determine the second received resonance frequency conforms to a second stored resonance frequency of a second trusted object. At step 706, based on determining the first received resonance frequency conforms to the first stored resonance frequency of the first trusted object at step 704, the tone transmitting module 82 may transmit the second tone from the mobile device 60 to the surface of the second object. At step 708, based on transmitting the second tone to the surface of the second object at step 706, the resonance frequency receiving module 84 may receive the second resonance frequency from the second object. At step 710, based on receiving the second resonance frequency at step 708, the comparing module 86 may compare the second received resonance frequency from the second object to determine the second received resonance frequency conforms to the second stored resonance frequency of the second trusted object.

At step 712, based on determining the first received resonance frequency conforms to the first stored resonance frequency of the first trusted object at step 704 and based on determining the second received resonance frequency conforms to the second stored resonance frequency of the second trusted object at step 710, the device securing module 88 unlocks the mobile device 60.

Figure 8:
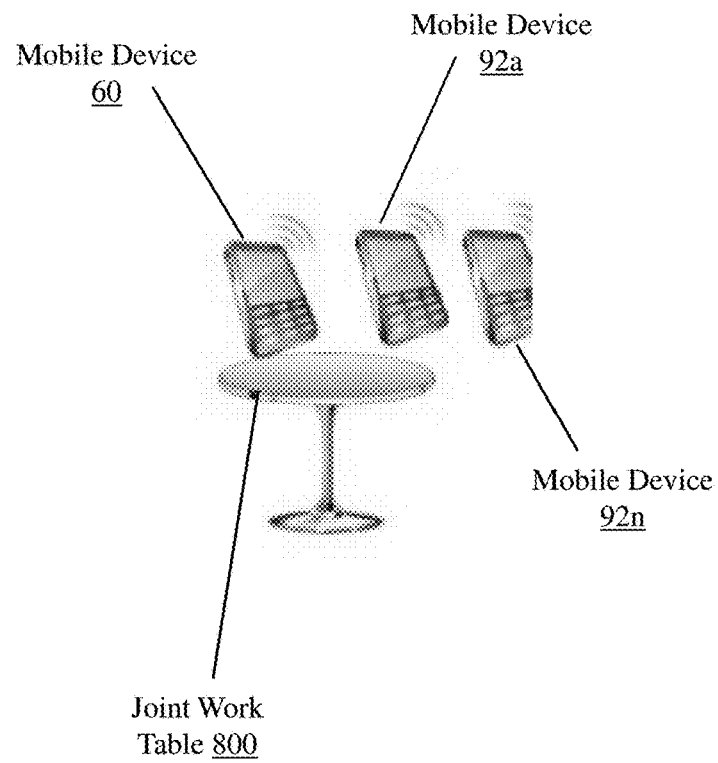
FIG. 8 shows an exemplary use in accordance with embodiments of the invention.

FIG. 8 depicts an exemplary use scenario in accordance with embodiments of the invention, wherein multiple devices are placed on a single surface at the same location to unlock the multiple devices for a specific purpose (e.g., file transfer amongst the devices). The scenario of FIG. 8 may be performed in the environment of FIG. 2. In aspects, based on the mobile devices (60, 92a, and 92n) being placed on an object (i.e., a joint work table 800), the device calibrating module 80 of the mobile device 60 synchronizes with the calibrating modules of the mobile device 92a and the mobile device 92n. In aspects, the device calibrating module 80 transmits (e.g., over Bluetooth) synchronization information to the calibrating modules of the mobile device 92a and the mobile device 92n. In aspects, the synchronization information includes timing data of a time to transmit a tone to the surface of the joint work table 800.

In aspects, based on transmitting the synchronization information, the device calibrating module 80 of the mobile device 60 receives synchronization response data from the calibrating modules of the mobile device 92a and the mobile device 92n. The synchronization response data includes verification that the synchronization information has been received by the calibrating modules of the mobile device 92a and the mobile device 92n and acknowledgment that the mobile device 92a and the mobile device 92n will simultaneously transmit the tone to the surface of the joint work table 800 at a predefined time (e.g., at a time specified by the mobile device 60).

In aspects, based on the receiving the synchronization response data, the mobile devices (60, 92a, and 92n) simultaneously transmit a tone to the surface of the joint work table 800. In aspects, based on simultaneously transmitting the tone, the mobile devices (60, 92a, and 92n) each receive a compound resonance frequency from the joint work table 800. In aspects, the compound resonance frequency is a resonance frequency from an object (i.e., the joint work table 800) when the object is driven by multiple vibrating devices (i.e., the mobile devices 60, 92a, and 92n).

In aspects, based on receiving the compound resonance frequency, the comparing module 86 of each of the mobile devices (60, 92a, and 92n) compares the received compound resonance frequency from the joint work table 800 with the stored compound resonance frequency of a trusted joint work table. In aspects, based on receiving the compound resonance frequency from the joint work table 800 conforming to the stored compound resonance frequency of the trusted joint work table, the device securing module 88 of each of the mobile devices (60, 92a, and 92n) unlocks the respective mobile devices (60, 92a, and 92n). In aspects, based on unlocking of the mobile devices (60, 92a, and 92n), the calibration module 80 of each of the mobile devices (60, 92a, and 92n) transmits a request to establish a group connection between the mobile devices (60, 92a, and 92n) to share information between the mobile devices (60, 92a, and 92n).

Figure 9:
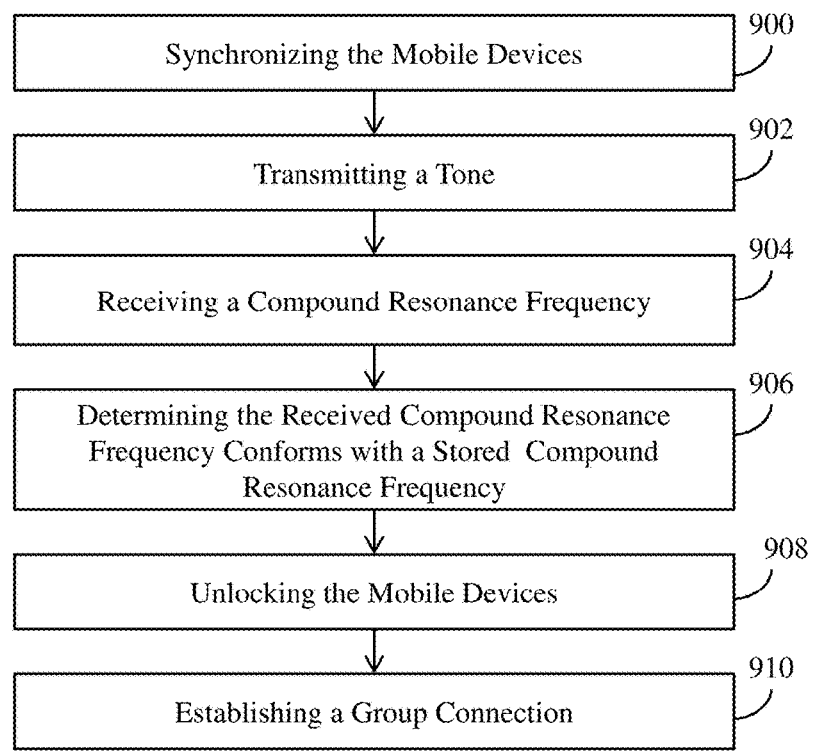
FIG. 9 illustrates a flowchart of steps of a method in accordance with aspects of the invention.

FIG. 9 shows a flowchart of steps of a method in accordance with aspects of the invention. The steps of the method may be performed in the system of FIG. 2 and are described with reference to the elements and functions described in FIGS. 2 and 8.

At step 900, the mobile device 60 synchronizes with the mobile device 92a and the mobile device 92n. In aspects, the device calibrating module 80 of the mobile device 60 synchronizes with device calibrating module of the mobile device 92a and the device calibrating module of the mobile device 92n. In aspects, the device calibrating module 80 transmits synchronization information to the calibrating modules of the mobile devices 92a and 92n and receives synchronization response data from the calibrating modules of the mobile devices 92a and 92n.

At step 902, based on synchronizing of the mobile devices (60, 92a, and 92n) at step 900, the mobile devices (60, 92a, and 92n) simultaneously transmit a tone to a surface of an object. In aspects, based on synchronizing of the mobile devices (60, 92a, and 92n) at step 900, each of the tone transmitting modules (e.g., the transmitting module 82 of the mobile device 60) of the mobile devices (60, 92a, and 92n) simultaneously transmit the tone to the surface of the object.

At step 904, based on simultaneous transmitting the tone at step 902, the mobile device 60 receives a compound resonance frequency (i.e., frequency response) from the object. In aspects, based on simultaneous transmitting the tone at step 902, each of the resonance frequency receiving modules (e.g., the resonance frequency receiving module 84 of the mobile device 60) of the mobile devices (60, 92a, and 92n) receive the compound resonance frequency from the object.

At step 906, based on receiving the compound resonance frequency at step 904, the mobile device 60 compares the received compound resonance frequency of the object to determine the received compound resonance frequency conforms to a stored compound resonance frequency of a trusted object. In aspects, based on receiving the compound resonance frequency at step 904, each of the comparing modules (e.g., the comparing module 86 of the mobile device 60) of the mobile devices (60, 92a, and 92n) compares the received compound resonance frequency to determine the received compound resonance frequency conforms to the stored compound resonance frequency of the trusted object.

At step 908, based on determining the received compound resonance frequency conforms to the stored compound resonance frequency at step 906, the mobile device 60 unlocks. In aspects, based on determining the received compound resonance frequency conforms to the stored compound resonance frequency at step 906, each of the device securing modules (e.g., the device securing module 88) of the mobile devices (60, 92a, and 92n) unlock.

At step 910, based on unlocking the mobile devices (60, 92a, and 92n) at step 908, the mobile device 60 transmits a request to establish a group connection between the mobile devices (60, 92a, and 92n). In aspects, based on unlocking the mobile devices (60, 92a, and 92n) at step 908, each of the device calibrating modules (e.g., the device calibrating module 80) of the mobile devices (60, 92a, and 92n) transmits a request to each other to establish the group connection between the mobile devices (60, 92a, and 92n). In aspects, based on establishing a connection, the mobile devices (60, 92a, and 92n) share information with each other.

Figure 10:
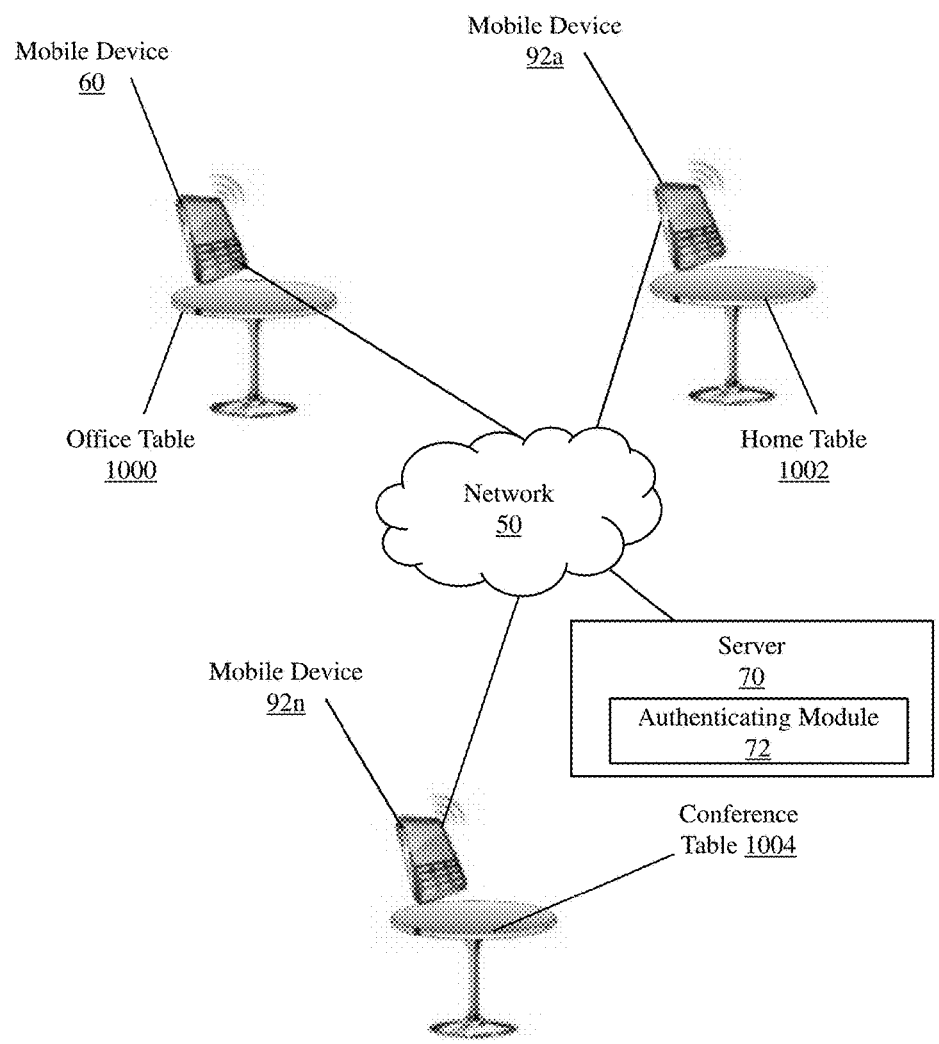
FIG. 10 shows an exemplary use in accordance with embodiments of the invention.

FIG. 10 depicts an exemplary use scenario in accordance with embodiments of the invention, wherein multiple devices are placed on a surface of an object at different locations. The scenario of FIG. 10 may be performed in the environment of FIG. 2. In this scenario, the mobile devices (60, 92a, and 92n) are placed on an office table 1000, a home table 1002, and a conference table 1004, respectively. In aspects, the server 70 communicates with the mobile devices (60, 92a, and 92n) at remote locations. In aspects, the server 70 receives a request from the mobile device 60 to establish a collaborative group communication with the mobile device 92a and the mobile device 92n. In aspects, the request includes the identity of the mobile device 60 making the request and the identity of the mobile device 92a and the mobile device 92n used in the collaborative group communication. In aspects, based on receiving the request for establishing the collaborative group communication, the authenticating module 72 transmits authentication information to the mobile devices (60, 92a, and 92n) over the network 50. In aspects, based on transmitting authentication information, the authenticating module 72 receives the results of the unlocking of the mobile devices (60, 92a, and 92n). In aspects, based on receiving the results of the unlocking, the server 70 establishes group communication between the mobile devices (60, 92a, and 92n).

Figure 11:
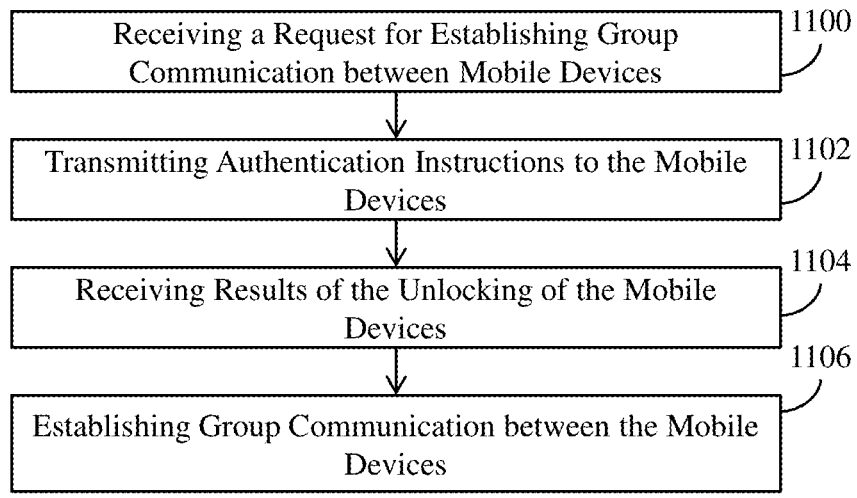
FIG. 11 illustrates a flowchart of steps of a method in accordance with aspects of the invention.

FIG. 11 shows a flowchart of steps of a method in accordance with aspects of the invention. The steps of the method may be performed in the system of FIG. 2 and are described with reference to the elements and functions described in FIGS. 2 and 10.

At step 1100, the server 70 receives a request from the mobile device 60 to establish a collaborative group communication with the mobile device 92a and the mobile device 92n. At step 1102, based on receiving the request at step 1100, the authenticating module 72 transmits authentication information to the mobile devices (60, 92a, and 92n).

At step 1104, based on transmitting authentication information at step 1102, the authenticating module 72 receives the results of the unlocking of the mobile devices (60, 92a, and 92n). In aspects, the unlocking of the mobile devices (60, 92a, and 92n) is based on each of the mobile devices (60, 92a, and 92n) transmitting a tone to a surface of their respective objects, receiving a resonance frequency from their respective objects, and comparing the received resonance frequency their respective objects to determine that the received resonance frequency conforms to a stored resonance frequency of their respective trusted objects. At step 1106, based on receiving the results of the unlocking at step 1104, the server 70 establishes group communication between the mobile devices (60, 92a, and 92n).

In embodiments, a service provider could offer to perform the processes described herein. In this case, the service provider can create, maintain, deploy, support, etc., the computer infrastructure that performs the process steps of the invention for one or more customers. These customers may be, for example, any business that requires mobile device security. In return, the service provider can receive payment from the customer(s) under a subscription and/or fee agreement and/or the service provider can receive payment from the sale of advertising content to one or more third parties.

In still another embodiment, the invention provides a computer-implemented method. In this case, a computer infrastructure, such as computing system 102 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computing system 102 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method, comprising:
   transmitting, by a computer device, a tone to a surface of an object;
   detecting, by the computer device, a frequency response from the object based on the transmitted tone;
   determining, by the computer device, that the detected frequency response from the surface of the object conforms to a stored frequency response, wherein the determining comprises comparing a detected resonance frequency of the object to a stored resonance frequency;
   wherein the stored frequency response is a resonance frequency of a trusted object;
   wherein the determining further comprises comparing the detected resonance frequency of the object, a detected temporal period, a detected transmissibility, and a detected damping coefficient of the object to the stored resonance frequency, a stored temporal period, a stored transmissibility, and a stored damping coefficient; and
   unlocking, by the computer device, the computer device based on the determining.

2. The method of claim 1, wherein the frequency response comprises the resonance frequency of the object.

3. The method of claim 1, wherein the frequency response comprises a temporal period, a transmissibility, and a damping coefficient of the surface of the object.

4. The method of claim 3, wherein a microphone on the computer device receives the frequency response.

5. The method of claim 1, further comprising calibrating, by the computer device, the computer device to the object.

6. The method of claim 5, wherein the calibrating comprises:
   transmitting multiple signals to the object;
   receiving a resonance frequency from the object;
   storing the resonance frequency of the object.

7. The method of claim 1, wherein the tone comprises one of a pulse of white noise and a pulse of a particular frequency.

8. The method of claim 7, wherein a speaker on the computer device transmits the tone.

9. The method of claim 1, wherein the unlocking is based on the detected frequency response from the object conforming to the stored frequency response of the trusted object.

10. A computer program product comprising a computer readable storage medium having program instructions embodied therewith, the program instructions executable by a computer device to cause the computer device to:
    calibrate the computer device to a first object; transmit a first tone to a surface of the first object;
    detect a first frequency response from the first object based on the transmitted first tone;
    determine that the detected first frequency response from the surface of the first object conforms to a stored first frequency response;
    based on the determining that the detected first frequency response from the surface of the first object conforms to the stored first frequency response, transmit a second tone to a surface of a second object;
    detect a second frequency response from the second object based on the transmitted second tone;
    determine that the detected second frequency response from the surface of the second object conforms to a stored second frequency response;
    wherein each of the first frequency response and the second frequency response comprises a temporal period, a transmissibility, and a damping coefficient of the surface of the object;
    wherein the stored first frequency response is a resonance frequency of a first trusted object, and the stored second frequency response is a resonance frequency of a second trusted object; and
    unlock the computer device based on the determining that the detected first frequency response from the surface of the first object conforms to the stored first frequency response and the determining that the detected second frequency response from the surface of the second object conforms to the stored second frequency response.

11. The computer program product of claim 10, wherein each of the first tone and the second tone comprises one of a pulse of white noise and a pulse of a particular frequency.

12. The computer program product of claim 10, wherein a microphone on the computing device receives the first frequency response and the second frequency response.

13. The computer program product of claim 10, wherein the unlocking is based on the detected first frequency response from the first object conforming to the stored first frequency response of the first trusted object and the detected second frequency response from the second object conforming to the stored second frequency response of the second trusted object.

14. A system comprising:
    a CPU, a computer readable memory and a computer readable storage medium associated with a computer device;
    program instructions to calibrate the computer device to an object and store a resonance frequency of the object based on the calibrating; program instructions to transmit a tone to a surface of the object;
    program instructions to detect a resonance frequency of the object based on the transmitted tone;
    program instructions to determine that the detected resonance frequency from the surface of the object conforms to a stored resonance frequency;
    wherein the determining comprises comparing the detected resonance frequency, a detected temporal period, a detected transmissibility, and a detected damping coefficient of the object to the stored resonance frequency, a stored temporal period, a stored transmissibility, and a stored damping coefficient of a trusted object; and
    program instructions to unlock the computer device based on the determining, wherein the program instructions are stored on the computer readable storage medium for execution by the CPU via the computer readable memory.

15. The system of claim 14, wherein the unlocking is based on the detected resonance frequency from the object conforming to the stored resonance frequency of the trusted object.

* * * * *